(12) United States Patent
Schmitt

(10) Patent No.: US 6,240,355 B1
(45) Date of Patent: May 29, 2001

(54) METHOD AND DEVICE FOR CONTROLLING THE DRAG TORQUE OF AN INTERNAL COMBUSTION ENGINE

(75) Inventor: Johannes Schmitt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/426,475

(22) Filed: Oct. 26, 1999

(30) Foreign Application Priority Data

Oct. 28, 1998 (DE) .............................. 198 49 666

(51) Int. Cl.⁷ .................................................. F02D 35/00
(52) U.S. Cl. ................... 701/84; 701/85; 701/86; 701/103; 701/104
(58) Field of Search .................. 701/84, 85, 86, 701/103, 104; 123/325

(56) References Cited

U.S. PATENT DOCUMENTS

| | | | |
|---|---|---|---|
| 5,168,952 | * 12/1992 | Oono et al. | 180/197 |
| 5,657,230 | * 8/1997 | Hess et al. | 364/431.052 |
| 5,676,111 | 10/1997 | Zhang | 123/325 |
| 5,868,474 | * 2/1999 | Abe et al. | 303/140 |
| 6,098,592 | * 8/2000 | Hess et al. | 123/350 |

FOREIGN PATENT DOCUMENTS 195 18 813    12/1996   (DE) .

\* cited by examiner

*Primary Examiner*—William A. Cuchlinski, Jr.
*Assistant Examiner*—Marthe Marc-Coleman
(74) *Attorney, Agent, or Firm*—Kenyon & Kenyon

(57) ABSTRACT

In a method and a device for controlling the drag torque of an internal combustion engine, a setpoint for the air supply to the internal combustion engine is held substantially constant during control of the drag torque in case of a tendency to instability of at least one wheel, and the drag torque is controlled by alteration of a second setpoint for the ignition angle and/or the fuel metering.

12 Claims, 3 Drawing Sheets

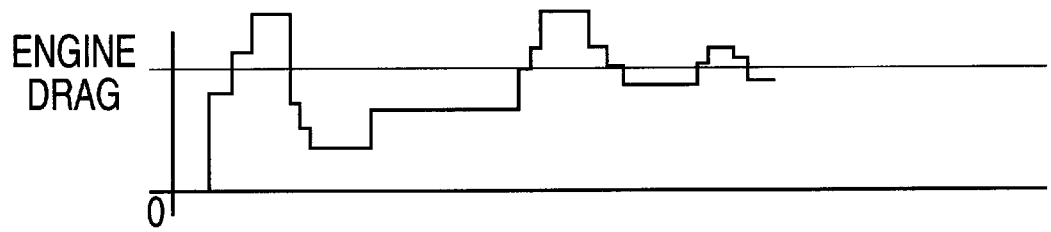
FIG. 3a
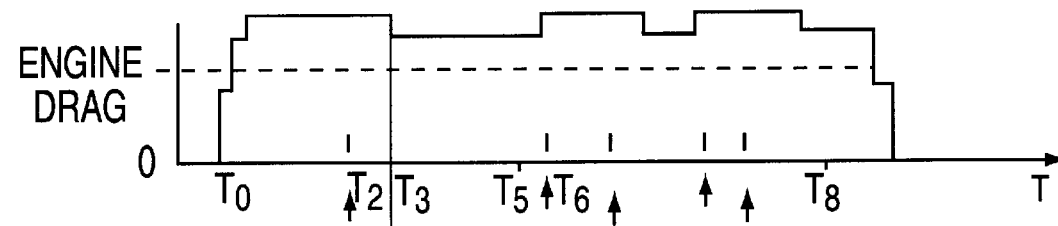
FIG. 3b
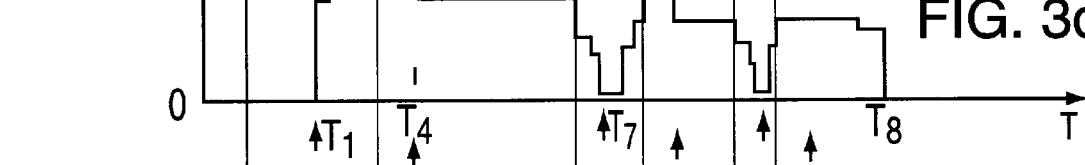
FIG. 3c
FIG. 3d
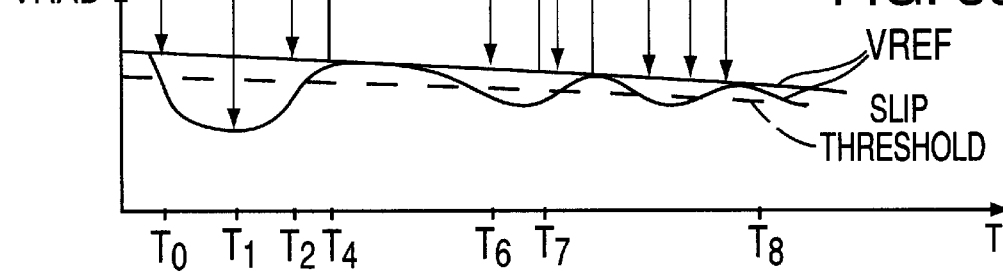
FIG. 3e
FIG. 3f

METHOD AND DEVICE FOR CONTROLLING THE DRAG TORQUE OF AN INTERNAL COMBUSTION ENGINE

BACKGROUND INFORMATION

According to German Patent No. 195 18 813 (corresponding to U.S. Pat. No. 5,676,111), on the basis of a torque setpoint supplied under active engine drag torque control, a setpoint governing the air supply to an internal combustion and an alteration of the ignition angle setting of the internal combustion engine is effected in such a way that the torque of the internal combustion engine takes on the specified setpoint value. In this design approach, air alteration and ignition angle alteration take place in parallel to one another under active engine drag torque control. Because the action on the ignition angle affects the torque more quickly than the action via the air supply, which is associated with longer lag times, substantial changes in the ignition angle result, by which the instantaneous differences between torque and setpoint are compensated. This is undesirable in some applications, for example with a view to control comfort and control quality.

SUMMARY OF THE INVENTION

It is an object of the present invention to identify actions with whose help an engine drag torque control is improved.

The present invention provides an engine drag torque control characterized by high control comfort. By virtue of the fact that the setting of the air supply remains substantially constant during engine drag torque control, changes in the outputs (output magnitude) of the engine drag torque control are regulated almost exclusively by a fast action on the engine (e.g., action on the ignition angle). This means that the control operates more smoothly on the whole and is nevertheless distinguished by good controllability. Wheel paths (profiles) at the slip optimum are achieved by virtue of the fast action on the engine. Phases in which drive slip occurs are effectively avoided.

It is particularly advantageous that the slow integral component of the engine drag torque controller gives the setpoint for the air supply, while the rapidly varying proportional and differential components act on the ignition angle path or, respectively, injection path.

In an exemplary embodiment, it is further advantageous that a further fast action (e.g., action on the fuel supply) is activated as a function of the slip, the wheel acceleration, and the time variation and/or the magnitude of the actual drive torque.

BRIEF DESCRIPTION OF THE DRAWINGS

FIG. 3a shows a first timing diagram according to the present invention.

FIG. 3b shows a second timing diagram according to the present invention.

FIG. 3c shows a third timing diagram according to the present invention.

FIG. 3d shows a fourth timing diagram according to the present invention.

FIG. 3e shows a fifth timing diagram according to the present invention.

FIG. 3f shows a sixth timing diagram according to the present invention.

DETAILED DESCRIPTION

Figure 1:
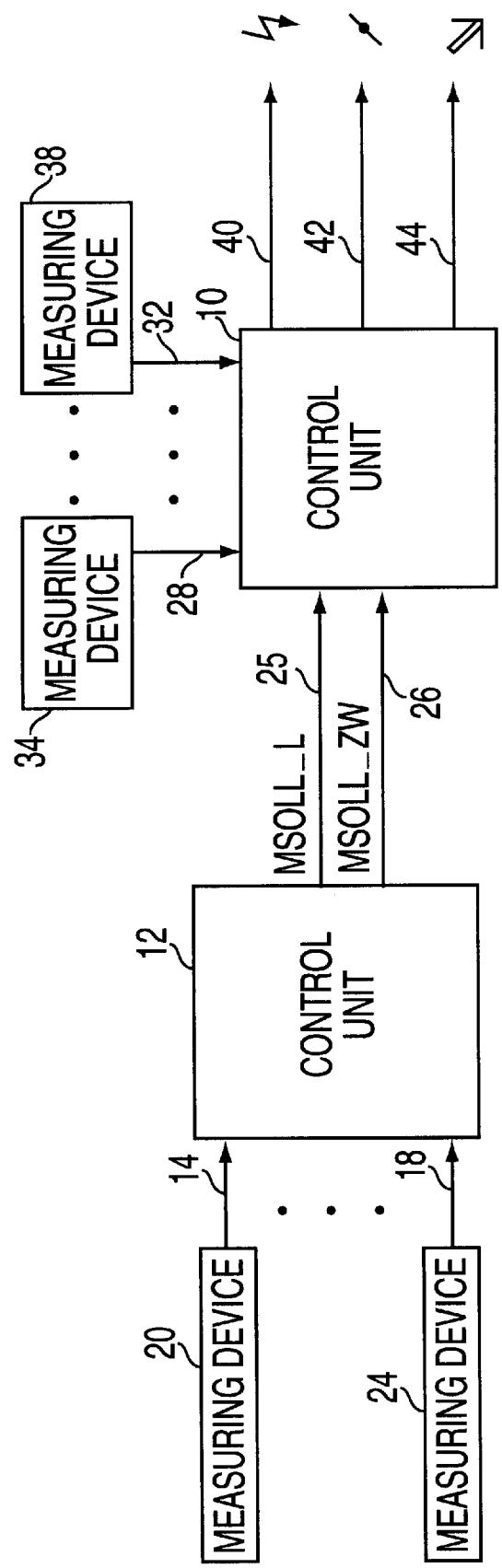
FIG. 1 shows an overall schematic diagram of the control units for controlling the torque of a drive unit under engine drag torque control.

FIG. 1 shows a first control unit 10 for controlling an internal combustion engine and a second control unit 12, which is used for implementing at least one engine drag torque control and for specifying respective setpoints to control unit 10. In a preferred exemplary embodiment, control unit 12 is a control unit for controlling an anti-lock protection system, for drive slip control and/or for vehicle movement dynamics control. At least signals representing the speeds of the motor vehicle's wheels are supplied to control unit 12 via input lines 14 to 18 from respective measuring devices 20 to 24. From these wheel speeds, control unit 12, which has at least one microcomputer, forms setpoints for the torque of the drive unit in the context of engine drag torque control. According to the means provided for attaining the inventive object, control unit 12 forms at least two distinct setpoints for engine drag torque control, a setpoint MSOLL_L for adjusting the air supply to the internal combustion engine, and a second setpoint MSOLL_ZW for a fast action (e.g., for adjusting the ignition angle). These setpoints are transmitted via communications lines 25 and 26 to control unit 10, which implements the setpoint for the air supply by actuating an electrically operable throttle valve and implements the setpoint for the fast action by ignition angle control and/or by control of the quantity of fuel to be metered. Performance quantities, for example engine speed, engine temperature, supplied air mass, etc., which are read by control unit 10 from respective measuring devices 34 to 38 via input lines 28 to 32, are used for this purpose. The performance parameters of the internal combustion engine, throttle valve position, ignition angle and injection quantity, are controlled via output lines 40, 42 and 44 shown in FIG. 1.

To implement the engine drag torque control, the engine torque is initially increased, as previously, by altering the air supply, in particular by increasing the air supply. A corresponding setpoint specification is transmitted by control unit 12 to control unit 10. When an engine torque that produces drive slip and reduces drag slip is attained, this setpoint is held substantially constant. At this point in time, a second setpoint specification, which acts on the ignition and/or the injection, takes effect in order to control the engine drag torque. The reduction in drive torque necessary in order to avoid drive slip is then effected by this second setpoint specification. The further control of wheel slip takes place in conventional fashion via this fast action. The setpoint is increased when the slip threshold is exceeded; it is reduced when the slip threshold is not attained. In this way, a wheel path at the slip optimum is achieved with a substantially constant throttle valve position. When the action of the engine drag torque control ends, that is, when no drag slip occurs for a certain time while there is no action on the ignition angle and/or fuel metering, the throttle valve position is again reduced to its initial value.

In an advantageous embodiment, a PID controller for engine drag torque control is split in such a way that the integral component furnishes the torque setpoint for the air supply and the proportional and differential components furnish the setpoints for the ignition action and/or injection action. In a further embodiment, the second fast action (ignition or injection) is initiated when the slip, the wheel acceleration, the time variation and/or the magnitude of the actual drive torque have exceeded predetermined threshold values.

Figure 2:
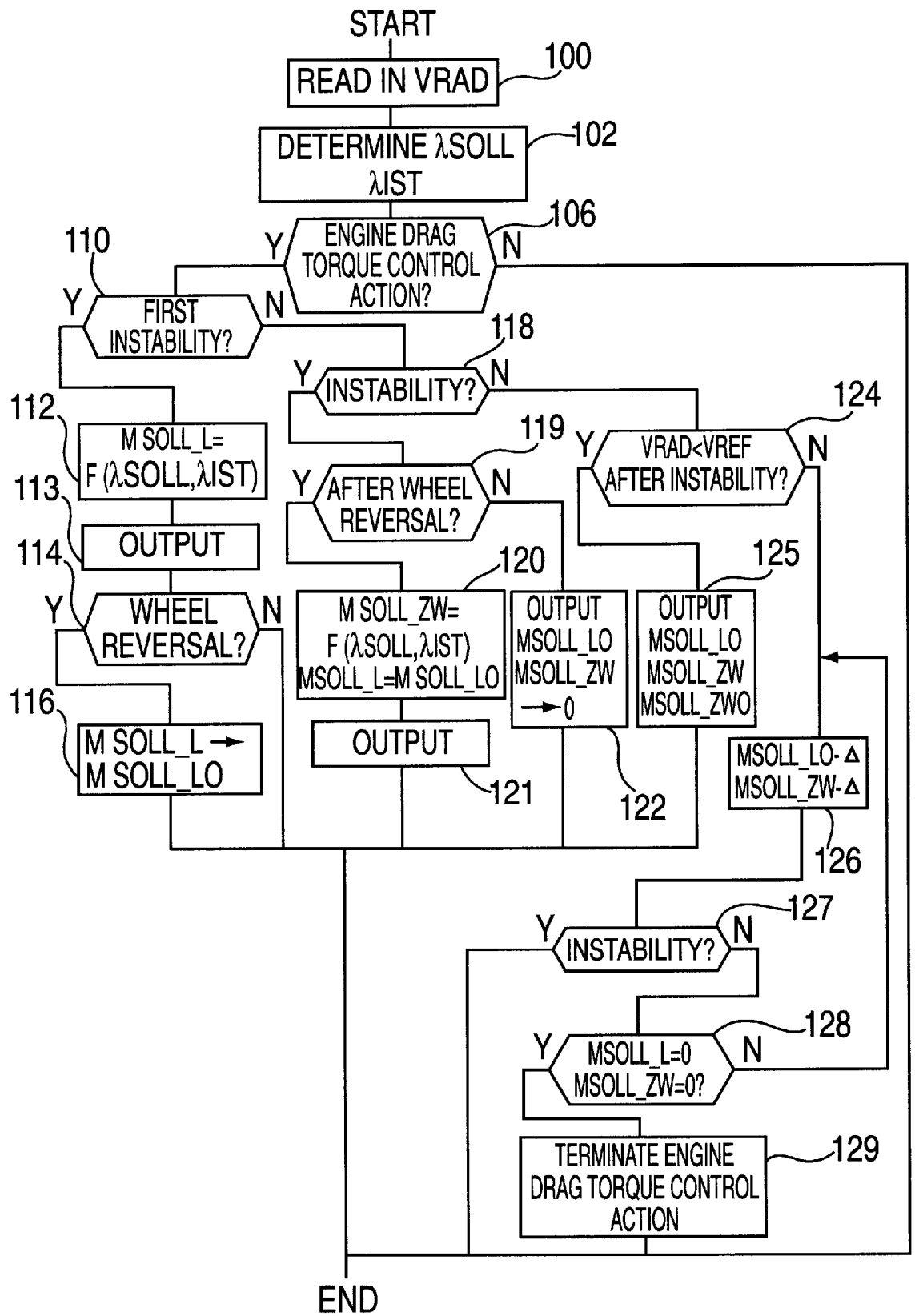
FIG. 2 illustrates, in the form of a flow chart, a preferred embodiment of the present invention.

FIG. 2 employs a flow chart to illustrate a preferred embodiment of the present invention. The flow chart represents a program that runs in the microcomputer of control unit 12.

The program is initiated at predetermined points in time. At first step 100, the individual wheel speeds VRADi are read in. Next, at step 102, slip setpoint λSoll is calculated, and for each wheel the pertinent actual slip λIst is calculated from the wheel speeds, for example by comparison of the wheel speeds of the wheel concerned with a reference value. At step 106, a test is then performed to determine whether engine drag torque control is to be performed. This is the case at least when, in unbraked operation, a tendency to locking has been detected in at least one driven wheel. Engine drag torque control can also be initiated in order to readjust the throttle valve if the ignition angle adjustment range is not adequate and/or in order to protect the catalyst or prevent overheating when the ignition angle has been adjusted for a predetermined time. These actions are also initiated during active engine drag torque control. The action in case of instability, that is, when at least one driven wheel shows a tendency to locking, is described in what follows. A flag indicating active engine drag torque control is set. If engine drag torque control is not to be performed or if it has been completed (no further locking tendency when actions are terminated), the program ends without the transmission of a setpoint and is executed again at the next time.

If the answer at step 106 is yes, a test is performed at step 110 to determine whether the instability identified on the basis of the actual and nominal slip was detected for the first time. If so, the torque setpoint for the air action MSOLL_L is calculated at step 112 on the basis of the nominal and actual slip in accordance with the integral component of a controller and output to the engine control at step 113. The setpoint for the fast action is either not transmitted or set to zero for purposes of transmission. Next, at step 114, a test is performed to determine whether the increase in the air supply has led to a wheel reversal. This test is performed on the basis of the wheel speed, a wheel reversal being detected when the wheel speed again changes toward the reference speed, that is, the wheel acceleration changes its operational sign. If not, the program terminates and is executed again at the next time.

If, however, a wheel reversal has occurred according to step 114, the instantaneous torque setpoint for the air supply MSOLL_L is saved as MSOLL_L0 at step 116. A flag identifying the first-time instability is reset, so that an answer of no will result at step 110 in the next program execution after step 116. If an answer of no was obtained at step 110, a test based on the nominal slip and actual slip values is performed at step 118 in order to determine whether instability is occurring (still or again) in at least one driven wheel. If so, that is, if the slip of at least one driven wheel is less than the setpoint or threshold value, a test is performed at step 119, based for example on flags and the wheel acceleration, to determine whether the corresponding wheel is before or after a wheel reversal. If it is after a wheel reversal, that is, if the instability is decaying, then the torque setpoint Msoll_ZW, which is set via the fast action path (ignition angle, fuel metering), is calculated from the nominal and actual slip. In the preferred exemplary embodiment, the setpoint for the fast action path MSOLL_ZW is determined as a function of at least nominal slip and actual slip by way of the proportional and differential components of the controller. The setpoint for the air action MSOLL_L remains at the value MSOLL_L0. At succeeding step 121, the two setpoints are transmitted to the engine control, the program terminates and is executed again at the next time.

If step 119 gave the result that the wheel in question is before wheel reversal, stored value MSOLLhd —L0 and a setpoint for the fast action MSOLL_ZW, which exhibits a value of zero, are output to the engine control at step 122. If setpoint MSOLL_ZW at step 119 is not zero in the case of a detected wheel reversal, it is driven to zero either according to a time function or as a function of the wheel behavior (variation of actual slip, variation of wheel speed, etc.). The program then terminates and is executed again at the next time.

If no instability was detected at step 118, a test is performed at step 124 to determine whether the wheel in question is after a vanishing of the instability between slip threshold and reference speed. The reference speed here is approximately the vehicle speed. The slip threshold is formed from it, for example by the addition of a slip setpoint. If, for example, the speed of the wheel in question is lower than the reference value, the stored setpoint for the air supply MSOLL_L0 is output again at step 125. The setpoint MSOLL_ZW present upon vanishing of the instability is saved (MSOLL_ZW0). The program then terminates and is executed again at the next time.

If step 124 gave the result that the reference speed was attained by the wheel in question, then, at step 126, setpoints MSOLL_L and MSOLL_ZW are reduced until a new instability occurs (step 127). If both are zero, the engine drag torque control action is terminated (step 128, 129).

The mode of action of the approach described in FIG. 2 is illustrated in detail on the basis of timing diagrams for the example of a preferred embodiment of this approach. The time variation of the difference between the setpoints for the air supply MSOLL_L and for the fast action MSOLL_ZW is plotted in FIG. 3a; that of the setpoint for the air supply MSOLL_L, in FIG. 3b. The time variation of a binary signal indicating the instability of the wheel under consideration is plotted in FIG. 3c. The time variation of the torque setpoint for the fast action MSOLL_ZW is plotted in FIG. 3d, while the binary signal for wheel reversal is shown in FIG. 3e. Finally, the time variation of the wheel speed VRAD in this example is shown in FIG. 3f.

In the example of FIGS. 3a–3f, the first-time instability occurs at time T0 because at this time the wheel speed goes below the slip setpoint derived from the reference speed VREF and thus indicates drag slip (compare FIGS. 3c, 3f). In this case, the setpoint for the air supply MSOLL_L is increased in correspondence to the slip value (compare FIG. 3b). The plotted stairstep variation therefore causes a new setpoint to be calculated with every program execution. At time T1, the wheel reversal is detected (FIGS. 3e, 3f), that is, the wheel speed again moves toward the slip threshold. The setpoint for the air supply is therefore held substantially constant at this time, and slip control is regulated by the action on the ignition angle via the setpoint MSOLL_ZW (FIG. 3d, T1 to T6). After the decay of the instability at time T2, the setpoints are held fixed (compare FIGS. 3b, 3d). When the reference speed is attained, the setpoints are driven (notched) down until instability occurs again (compare FIGS. 3b, 3d and time T6). Upon a recurrence of instability, the initial setpoint MSOLL_L is again output (FIG. 3b), and the setpoint MSOLL_ZW is driven down to zero (FIG. 3d). At time T7, in response to the beginning of the wheel reversal, the torque setpoint for the ignition angle is again increased in order to reduce drive power, and the control process is executed again. This process is repeated until, at time T8 after the reference speed has been attained, there is no further failure to attain the slip threshold. The torque setpoint for the air supply and for the fast action are returned to zero (compare FIGS. 3b, 3d). Engine drag torque control is terminated.

In another exemplary embodiment, not the ignition angle, but the fuel supply is acted on by the torque setpoint for fast action, for example by turning off the fuel supply to individual cylinders and/or by altering the air/fuel ratio. In a further exemplary embodiment, both action options are present.

In a particularly advantageous exemplary embodiment, a torque setpoint for the adjustment of the fuel metering is transmitted along with the torque setpoint for the ignition angle adjustment. The former is activated in addition to the torque setpoint for the ignition angle adjustment if a certain slip value is exceeded, a certain threshold for the wheel acceleration is exceeded, a predetermined time has elapsed without termination of control, and/or the drive torque of the internal combustion engine has exceeded a predetermined threshold. A further improvement in engine drag torque control with respect to its dynamics and control comfort is achieved by initiating the second threshold action.

In development of the method described on the basis of FIGS. 2 and 3a–3f, the throttle valve position is altered by appropriate modification (correction) of the setpoint MSOLL_L under certain operating situations, for example when the ignition angle adjustment range is not adequate and/or in order to protect the catalyst or prevent overheating when the ignition angle has been adjusted for a predetermined time. Control is then implemented appropriately, as described above, on the basis of an altered throttle valve position.

What is claimed is:

1. A method for controlling a drag torque of an internal combustion engine of a motor vehicle, comprising the steps of:

generating, as a function of signals representing wheel speeds of wheels of the motor vehicle, a first setpoint and a second setpoint for reducing the drag torque in case of an instability in at least one driven wheel of the motor vehicle, the first setpoint being a setpoint for controlling an air supply to the internal combustion engine, the second setpoint being a setpoint for controlling at least one of an ignition angle and a fuel metering of the internal combustion engine;

holding the first setpoint substantially constant and altering the second setpoint during a control of the drag torque when a tendency to instability is present; and controlling a drive unit of the motor vehicle to control the drag torque as a function of the first and second setpoints.

2. The method according to claim 1, wherein the first and second setpoints are generated by a first control unit and the first and second setpoints are transmitted to a second control unit, the first control unit being for controlling the drag torque of the engine, the second control unit being for controlling the engine.

3. The method according to claim 1, further comprising the steps of:

upon an occurrence of the tendency to instability of at least one wheel, altering the first setpoint until a drag slip decreases and a threshold is attained, thereafter holding the first setpoint substantially constant, and altering the second setpoint in accordance with a variation of a wheel speed.

4. The method according to claim 1, further comprising the step of:

determining the first and second setpoints using a controller having an integral component assigned to the first setpoint and having a proportional component and a differential component assigned to the second setpoint.

5. The method according to claim 1, further comprising the step of:

influencing at least one of the ignition angle and the fuel metering as a function of at least one of a slip, a wheel acceleration, a time variation and a magnitude of a drive torque of the engine.

6. A device for controlling a drag torque of an internal combustion engine of a motor vehicle, comprising:

a control unit receiving signals representing wheel speeds and outputting actuating signals for controlling the engine in order to reduce the drag torque in case of an instability of at least one driven wheel, the actuating signals including first and second setpoints for controlling a drive unit of the motor vehicle, the first setpoint being for controlling an air supply to the engine, the second setpoint being for controlling at least one of an ignition angle and a fuel metering, the control unit holding the first setpoint substantially constant during a control of the drag torque in case of a tendency to instability, the control unit controlling the drag torque by altering the second setpoint.

7. A method for controlling a drag torque of an internal combustion engine of a motor vehicle, comprising the steps of:

generating, as a function of signals representing wheel speeds of wheels of the motor vehicle, a first setpoint and a second setpoint for reducing the drag torque in case of an instability in at least one driven wheel of the motor vehicle, the first setpoint being a setpoint for controlling an air supply to the internal combustion engine, the second setpoint being a setpoint for controlling at least one of an ignition angle and a fuel metering of the internal combustion engine;

holding the first setpoint constant and altering the second setpoint during a control of the drag torque when a tendency to instability is present; and controlling a drive unit of the motor vehicle to control the drag torque as a function of the first and second setpoints.

8. The method according to claim 7, wherein the first and second setpoints are generated by a first control unit and the first and second setpoints are transmitted to a second control unit, the first control unit being for controlling the drag torque of the engine, the second control unit being for controlling the engine.

9. The method according to claim 7, further comprising the steps of:

upon an occurrence of the tendency to instability of at least one wheel, altering the first setpoint until a drag slip decreases and a threshold is attained, thereafter holding the first setpoint constant, and altering the second setpoint in accordance with a variation of a wheel speed.

10. The method according to claim 7, further comprising the step of:

determining the first and second setpoints using a controller having an integral component assigned to the first setpoint and having a proportional component and a differential component assigned to the second setpoint.

11. The method according to claim 7, further comprising the step of:

influencing at least one of the ignition angle and the fuel metering as a function of at least one of a slip, a wheel acceleration, a time variation and a magnitude of a drive torque of the engine.

12. A device for controlling a drag torque of an internal combustion engine of a motor vehicle, comprising:

a control unit receiving signals representing wheel speeds and outputting actuating signals for controlling the engine in order to reduce the drag torque in case of an instability of at least one driven wheel, the actuating signals including first and second setpoints for controlling a drive unit of the motor vehicle, the first setpoint being for controlling an air supply to the engine, the second setpoint being for controlling at least one of an ignition angle and a fuel metering, the control unit holding the first setpoint constant during a control of the drag torque in case of a tendency to instability, the control unit controlling the drag torque by altering the second setpoint.

* * * * *